United States Patent

Stanley et al.

[19]

[11] Patent Number: 6,005,552
[45] Date of Patent: Dec. 21, 1999

[54] COMPUTER MOUSE INTERFACE DEVICE

[76] Inventors: Carol A. J. Stanley, 454 Conger Ave., Collingswood, N.J. 08108; Margaret H. Christensen, 12 W. Possum Hollow Rd., Wallingford, Pa. 19086

[21] Appl. No.: 08/104,872

[22] Filed: Aug. 10, 1993

[51] Int. Cl.⁶ .................................................. G09G 5/08
[52] U.S. Cl. ......................... 345/163; 345/156; 345/157
[58] Field of Search .................................... 345/163–166, 345/156, 157; 178/18; 33/1 M, 1 AA, 1 R, 18.1; 248/118, 913, 918; D14/103–105

[56] References Cited

U.S. PATENT DOCUMENTS

| | | | |
|---|---|---|---|
| 4,129,746 | 12/1978 | Lambden | 178/18 |
| 4,369,439 | 1/1983 | Broos | 345/164 |
| 4,561,183 | 12/1985 | Shores | 345/163 X |
| 4,862,151 | 8/1989 | Grauz et al. | 178/18 X |
| 4,922,060 | 5/1990 | McJunkin | 345/163 X |
| 5,086,565 | 2/1992 | Cartwright | 33/1 AA |
| 5,219,136 | 6/1993 | Hassel et al. | 248/118 |
| 5,240,210 | 8/1993 | Hanto, Jr. et al. | 248/918 |

OTHER PUBLICATIONS

Nassimbene, E.G., "Mouse/Keyboard concept Incorporating unique devices For Controlling CRT Display Cursors," IBM Tech. Disc. Bulletin, vol. 27, Mar. 1985 pp. 6299–6305.

*Primary Examiner*—Bipin H. Shalwala
*Assistant Examiner*—Kent Chang
*Attorney, Agent, or Firm*—Eugene E. Renz, Jr.

[57] ABSTRACT

A device for use with a computer mouse including a platform for defining a surface for movement of the computer mouse thereon. Also included is a support supporting the platform in an operable position. A frame is mounted on the platform for defining a predetermined area in the platform surface for limiting movement of the mouse to the predetermined area.

14 Claims, 2 Drawing Sheets

COMPUTER MOUSE INTERFACE DEVICE

FIELD OF THE INVENTION

The present invention relates to a device for use with a computer mouse. More particularly, the present invention relates to a hinged ramp defining a surface on which the movement of a computer mouse is confined by a frame defining a predetermined area such that improved use in training of new users such as the elderly is possible.

BACKGROUND OF THE INVENTION

The elderly population is largest growing component of our society. Proponents of aging believe that an environment that is mentally, physically and emotionally challenging will aid the independence of the elderly in a successful aging process. The computer provides a unique opportunity to assist this aging process by offering increased communication via electronic mail, emergency or medical monitoring, financial services, entertainment and shopping.

Even though computers are becoming more frequently imbedded into everyday activities, little research is being done to guide in the design of computer interfaces for the use of the elderly.

It has been determined that elderly, those persons at least 75 years of age, are deficient in their ability to master the use of a computer mouse as an interface device with a computer. Alternatives to the computer mouse, which is normally highly effective and used in many personal computer situations, would be a new designed interface such as a touch screen or touch tablet. The elderly experience difficulties with all of these devices, but recent studies have shown that the use of a computer mouse creates the most problems for elderly who are seeking to learn to use a computer. As computer become imbedded into increasingly more items, such as VCRs, telephones, televisions, cooking appliances, security system, reservation system and the like, it would be more difficult for the elderly to conveniently function in this more technical society until the elderly, and anyone else newly entering the complexities of new technology, develop basic computer interface skills.

At the present time, the only investigation that has been made into computer interfaces has been with respect to the interface device itself. When devices such as mouses, rate control isometric joy sticks, step keys, and text keys, were evaluated for the proficiency of interface with a text on a CRT screen, it was determined that the mouse is the best interface device for that particular task. What has not evaluated is the difficulty that elderly persons incur in normal visual functioning and perception due primarily to advanced aging.

The visual changes which an individual under goes with aging are primarily related to the speed of processing, rather than the accuracy of processing data. However, it has also been determined that older adults can maintain their accuracy on an anticipatory motor task once they become familiar with the task. While it is known that motor skill is impacted by physiological, perceptual and cognitive factors, these factors have not been applied to computer interface design.

It has been found that successful aging focuses on maintenance of continued physical and mental activity at an appropriate level. The computer can provide tremendous opportunity to maintain a high level of mental activity if an interface device can be created which can be master by the elderly population. Accordingly, it is an object of this invention to provide an improved interface with a computer for use by aging persons and others.

It is an object of this invention to provide a device for interface with a computer which is easy to use.

Still another object of the present invention is provide an interface device for use with a computer which does not involve a substantial amount of training or learning.

Yet another object of the present invention is provide an interface which facilitates the physical relationship between the interface and the computer for the benefit of an elderly user.

Other objects will appear hereinafter.

SUMMARY OF THE INVENTION

It has now been discovered that the above and other objects of the present invention may be accomplished in the following manner. Particularly, it has been discovered that an improved device for use with a computer mouse may be provided. The device comprises a platform, support means for positioning the platform, and frame means for defining a predetermined area within which the mouse is used.

The platform means defines a surface for movement of the computer mouse thereon. Preferably, the platform includes an upper end for defining a surface and a lower end for providing a flat pad for resting an elbow when the user is moving the computer mouse on the surface.

The frame means includes a rectangular frame sized to define the predetermined area. The frame may also include guide rails for adjustable movement of the frame with respect to its location on the platform means. Thus, the frame is adjustable to vary the distance between the surface on which the mouse is used and the flat pad where the user's elbow is typically resting.

The support means not only support the platform but also position it so that it is in an optimum position. The support means is adapted to incline the platform means with respect to the horizontal flat surface on which the device is placed. This angle can be adjusted for the convenience of the user to be more or less similar to the angle of the computer screen with which is being used.

In a preferred embodiment, the support means includes a hinge for inclining the platform with respect to the horizontal and adjustable supports for locking the platform in one of a plurality of predetermined position with respect to the horizontal. The adjustable support comprises a hinged base portion having an end horizontally disposed for placement on a table and a second elevational end hingedly positioned with its outer terminal end for engagement with the platform. The platform includes ported support rails for engagement with the outer terminal end of the support to define a plurality of positions.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
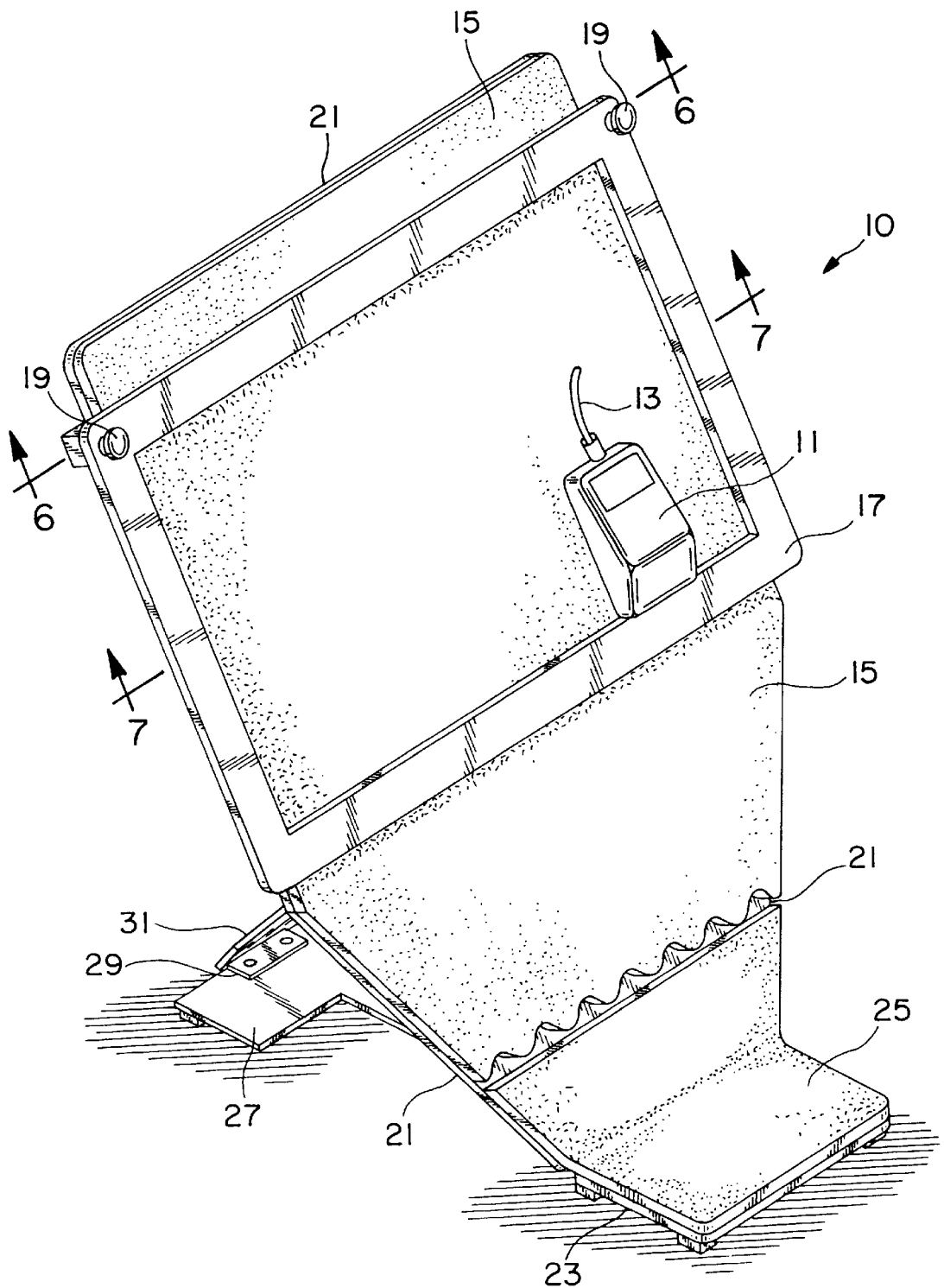
FIG. 1 is an isometric view of the device of this invention as viewed from the operator's side with the platform arbitrarily elevated to about 60° from the horizontal.
Figure 2:
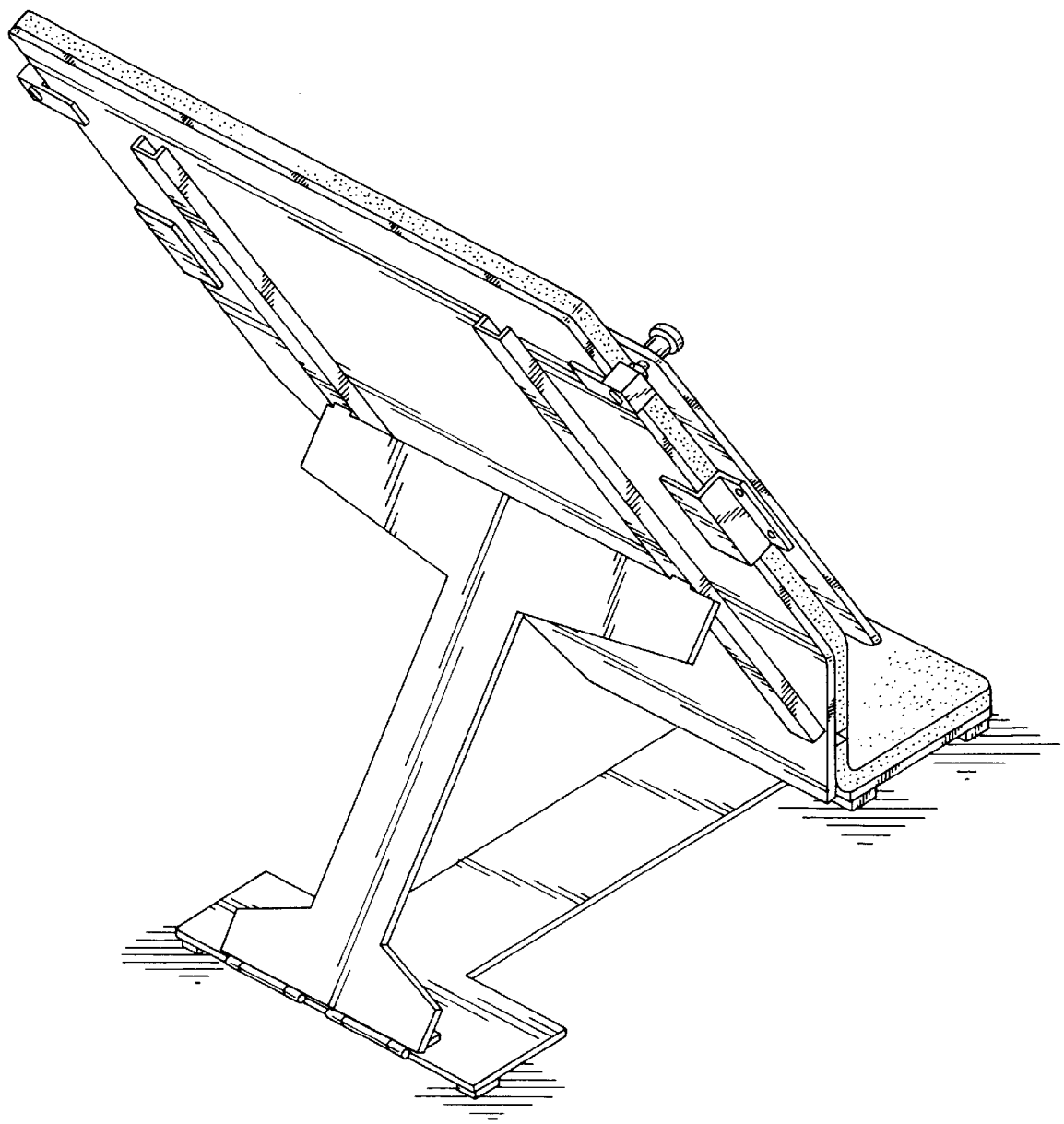
FIG. 2 is an isometric view of the device of the present invention shown in FIG. 1 as viewed from the side opposite from the operators position.

The device of the present invention is shown isometrically in FIGS. 1 and 2, generally by the reference numeral 10. As can be seen in FIG. 1, a computer mouse 11 is provided which is connected by wire 13 to a computer or the like, not shown.

The device itself comprises a platform 15, which defines a surface on which the mouse 11 is to operate and a frame 17 which defines an area on the surface 15 for limiting movement of mouse 11 to a predetermined area. Frame 17 can be positioned via adjustment knobs 19 as described hereinafter. Surface 15 is mounted on a platform 21 which is elevated to a desired angle of elevation from the horizontal. Base 23 is joined to platform 21 by pad 25 which is attached to both platform 21 and base 23 by glue or adhesive. Pad 25 is designed to function as an elbow rest so that the user may position his or her elbow on pad 25, moving mouse 11 within the confines of frame 17 as needed.

Turning now to FIG. 2, the position of platform 21 with respect to base 23 is determined by a support means which comprises a support base 27, hinges 29, and an upper support member 31. Support member 31 engages two ported support rails 33 with tabs 35 located on the outer terminal end of upper support 31. The precise positioning of the platform 21 with respect to the base 23 will depend upon the particular needs of the user. Ported support rails 33 extend over the majority of length of platform 21 and allow for a wide variety of locations to be selected as desired.

The position of frame 17 on the surface 15 is also adjustable to the needs of the individual using the device. Frame 17 is slidably supported on platform 21 and surface 15 with guide rails 37 and the guide rail element 39 associated with adjustment knobs 19. As can be seen in FIG. 2, loosing knobs 19 will allow frame 17 to adjustably slide or be moved to the desired location on platform 21 and surface 15. Adjustment knobs 19 are then tightened and the device is ready to use.

The device is compact and can be lowered to a flat configuration when not in use. It can also be adjusted to individual needs to accommodate a full range of users from young children to mature adults to the elderly.

It has been found that the above described device is capable of providing surprising improvements in the use of a computer mouse, particularly by those who do not have a present proficiency for this function. It has been discovered, for example, that the elderly, those at least 75 years of age, have a deficiency in the ability to master the use of a computer mouse as an interface device, particularly when the elderly person has no previously experience with this type of equipment.

One problem arises when the CRT of the computer is in the vertically plane and the mouse is on a horizontal table, so that the difference between the two planes is 90°. This causes an orientation problem for new computer users in some instances. In addition, the physical distance between the computer mouse, which must be clicked to activate elements in the computer, and the arrow on the screen, which represents the location of the mouse, can cause difficulty in orientation. Finally, a computer mouse reports relative motion since the mouse can be picked up and placed down on another location without any change in position of the designation on the computer screen. This also produces disorientation for computer novices.

As can be seen, the present invention defines and limits the optimum unimpeded movement of the computer mouse. The frame 17, which limits the movement of the mouse 11, never exceeds the maximum useability of the mouse. Test of the invention have shown that this design rapidly builds up muscle training due to the repetition of tasks confining the mouse to the region defined by the frame and building a point of reference. Apparently once the device is used, newly experienced computer operators find that they do not have to remember limitations on where the mouse resides. They are able to slant the surface of the mouse engaging device to eliminate disorientation caused by movement in two planes at one time. Both frail, elderly persons and novice users have increased psychomotor capability due to the appropriate placement of the frame to provide a motor cognitive reference.

In order the demonstrate the efficacy of the present invention, low key test were performed with various elderly persons and others. It was clear from the test that all of the persons were able to use the computer to at least select items from a list of items using the computer mouse. Fatigue was less and accuracy was increased. Additionally, training time is markedly reduced using the present invention.

While the invention has been particularly shown and described with reference to a preferred embodiment thereof, it is to be understood by those skilled in the art that various changes in form and details may be made therein without departing from the spirit and scope of the invention.

What is claimed is:

1. A device for use with a computer mouse comprising:

platform means for defining a surface for movement of a computer mouse thereon and including an upper end for defining said surface and a lower end for providing a flat pad for locating one elbow of a user when the user is positioning a computer mouse on said surface;

support means for supporting said platform means in an operable position and being adapted to adjustably incline said platform means with respect to the horizontal to adjust the orientation of said surface with respect to said pad and to provide a surface of support for a user from said elbow to said mouse; and frame means mounted on said platform means for defining a predetermined area in said platform means surface for limiting movement of said mouse to said predetermined area, said frame means including a rectangular frame sized to define said predetermined area and guide rails for adjustable movement of said frame with respect to a location on said platform means, said frame being adjustable to vary the distance between said surface and said flat pad to vary the length of said surface of support to accommodate a specific user.

2. The device of claim 1 wherein said support means is adapted to incline said platform means with respect to the horizontal.

3. The device of claim 2 wherein said support means includes hinged means for inclining said platform means with respect to the horizontal and includes adjustable supports for locking said platform means in one of a predetermined plurality of positions with respect to the horizontal.

4. The device of claim 3 wherein said adjustable support comprises a hinge base portion having one end horizontally disposed for placement on a table and a second end hingedly positioned with its outer terminal end for engagement with platform means.

5. The device of claim 4 wherein said platform means includes ported support rails for engaging said outer terminal end at said plurality of positions.

6. The device of claim 1 wherein the said frame means includes a rectangular frame sized to define said predetermined area and guide rails for adjustable movement of said frame with respect to a location on said platform means.

7. The device of claim 1 wherein said platform means further includes an upper end for defining said surface and a lower end for providing a flat pad for resting an elbow when the user is using a computer mouse on said surface.

8. The device of claim 7 wherein said frame is adjustable to vary the distance between said surface and said flat pad.

9. The device of claim 7 which further includes an upper pad for providing a mouse engaging cover on said surface.

10. A method for using a computer mouse comprising:

providing a platform means for defining a surface for movement of a computer mouse thereon;

supporting said platform means in an operable position; and defining a predetermined area in said platform means surface for limiting movement of said mouse to said predetermined area.

11. The method of claim 10 wherein said platform means in inclined with respect to the horizontal.

12. The method of claim 10 wherein said predetermined area is defined by a rectangular frame and guide rails are provided to adjust movement of said frame with respect to a location on said platform means.

13. The method of claim 12 wherein said frame is adjusted to vary the distance between said surface and said flat pad.

14. The method of claim 10 which further includes providing a mouse engaging cover on said surface.

* * * * *